United States Patent

Kashimura et al.

[11] Patent Number: 5,563,350
[45] Date of Patent: Oct. 8, 1996

[54] KARMAN'S VORTEX FLOW METER

[75] Inventors: Osamu Kashimura; Etsuro Ito, both of Kanagawa, Japan

[73] Assignee: Fuji Electric Co., Ltd., Japan

[21] Appl. No.: 263,339

[22] Filed: Jun. 21, 1994

[30] Foreign Application Priority Data

Jun. 22, 1993 [JP] Japan .................... 5-149644

[51] Int. Cl.⁶ .................................... G01F 1/32
[52] U.S. Cl. ........................... 73/861.22; 285/49
[58] Field of Search ............... 73/861.22, 861.18, 73/861.21; 285/49, 403, 404

[56] References Cited

U.S. PATENT DOCUMENTS

| | | | |
|---|---|---|---|
| 3,372,948 | 3/1968 | Arneson | 285/404 |
| 4,364,276 | 12/1982 | Shimazoe et al. | 73/706 |
| 4,414,851 | 11/1983 | Maglic | 73/706 |
| 4,438,954 | 3/1984 | Hattori | 285/404 |
| 4,790,821 | 12/1988 | Stines | 73/706 |

FOREIGN PATENT DOCUMENTS 4-256811 9/1992 Japan .

*Primary Examiner*—Richard Chilcot
*Assistant Examiner*—Harshad Patel
*Attorney, Agent, or Firm*—Finnegan, Henderson, Farabow, Garrett, & Dunner, L.L.P.

[57] ABSTRACT

A Karman's vortex flow meter eliminates the problem of external vibration resonating an amplifier casing to lower measurement accuracy of a vortex detecting section. In the flow meter, O-rings fit in two annular grooves formed on an outer surface of a supporting stand hollow cylinder. A casing fits onto the hollow cylinder of the supporting stand with the two O-rings being placed therebetween. A pair of blind holes or recesses formed in the hollow cylinder diametrically oppose one another and are located between the two O-rings. Bolts inserted into the recesses with gaps spaced around their end portions serve as stoppers by limiting axial movement of the casing with respect to the hollow cylinder.

10 Claims, 3 Drawing Sheets

KARMAN'S VORTEX FLOW METER

BACKGROUND OF THE INVENTION a) Field of the Invention

This invention relates to a Karman's vortex flow meter in which a difficulty is eliminated by provision of O-rings or damping members that the resonance of its amplifier's casing with an external vibration adversely affect a detecting section concerning Karman's vortex to lower the measurement accuracy.

b) Related Art

A conventional Karman's vortex flow meter will be described with reference to FIG. 5.

As shown in FIG. 5, a vortex generator 2 is inserted into a pipe line 1 in which fluid under test flows, in such a manner that the vortex generator 2 is extended diametrically across the pipe line 1. The vortex generator 2 comprises a columnar member provided on the upstream side (on the left of FIG. 5) and another columnar member provided on the downstream side (on the right of FIG. 5) (hereinafter referred to as "an upstream columnar member" and "a downstream columnar member", respectively, when applicable). In order to sealingly hold the fluid in the pipe line 1 and to prevent vibration at the junction of the vortex generator 2 and the pipe line 1, both end portions of the vortex generator 2 are engaged with the wall of the pipe line 1 through O-rings 5 and 6. A detecting bar 3 comprises: diskshaped diaphragm; a lower bar portion extended axially inwardly (downwardly in FIG. 5) from the diaphragm; and an upper bar portion which is threaded and extended axially outwardly (upwardly in FIG. 5) from the diaphragm (all having no reference numerals). The diaphragm is in contact with the upper end face of the vortex generator 2 through an O-ring 24. The lower end portion of the bar body, which is smaller in diameter than the remaining portion, is inserted through a sealing and vibration-proofing O-ring 4 into a hole formed in the downstream columnar member of the vortex generator 2. A piezo-electric element 7, an insulating plate 8, and a disk spring 9 are mounted on the threaded upper bar portion of the detecting bar 3 in the state order, and then fixedly secured with a balance weight 10 engaged with the threaded upper bar portion. The piezo-electric element 7 detects even a slight displacement of the small-diameter lower end portion of the detecting bar 3 as a displacement of the diaphragm, to output an electrical signal. The balance weight 10 serves as a nut being threadably engaged with the threaded upper bar portion of the detecting bar to secure the piezo-electric element 7, the insulating plate 8 and the disk spring 9 as was described above. In addition, the balance weight 10 has a function of eliminating the effects of vibrations, such as the vibration of the pipe line 1, other than those due to Karman's vortex.

On the other hand, a supporting stand 22 comprises a flange, and a hollow cylinder extended from the flange. The flange is fixedly mounted on the pipe line 1 with bolts 11 to fixedly secure the vortex generator 2 to the pipe line 1. The hollow cylinder incorporates a detecting section concerning Karman's vortex which includes the diaphragm of the vortex generator and the piezo-electric element 7. A casing assembly for a signal amplifier (hereinafter referred to as "an amplifier casing assembly", when applicable) is fixedly fitted on the hollow cylinder of the supporting stand 22. The amplifier casing assembly comprises: a casing 13; and two covers 14 which are threadably secured through O-rings 16 to the casing 13 from both sides. The amplifier casing assembly holds a printed circuit board inside, which includes a detecting circuit for obtaining a flow rate from the output of the piezo-electric element 7, and other circuits. The lower end portion of the casing 13 is fitted through one O-ring 15 on the upper end portion of the hollow cylinder of the supporting stand 22, and secured with a pair of right and left bolts 17. The O-ring 15 is used to sealingly isolate the interior containing the detecting section and the detecting circuit from the exterior.

The above-described conventional Karman's vortex flow meter is disadvantageous in that it is liable to be affected by external vibrations. That is, when the amplifier casing assembly resonates with an external vibration, the resonance is transmitted through the supporting stand 22 to the detecting section including the piezo-electric element 7, thus affecting the output of the latter 7. Hence, in the case where the pipe line vibrates greatly to oscillate the Karman's vortex flow meter, and the flow rate is small, the measurement of flow rate is adversely affected by the vibration, thus being low in accuracy.

SUMMARY OF THE INVENTION

Accordingly, an object of this invention is to eliminate the above-described difficulty accompanying a conventional Karman's vortex flow meter. More specifically, an object of the invention is to provide a Karman's vortex flow meter which is free from the difficulty that the resonance of its amplifier's casing with an external vibration adversely affects its Karman's vortex detecting section to lower the measurement accuracy.

The foregoing object of the invention has been achieved by the provision of the following means:

The first means is a Karman's vortex flow meter which comprises:

- a supporting stand having a hollow cylinder in which a section concerning Karman's vortex is built, the supporting stand being mounted on a pipe line; O-rings fitted in annular grooves formed in the outer surface of the hollow cylinder of the supporting stand;
- a casing for an amplifier adapted to amplify a signal concerning Karman's vortex, the casing being fitted on the hollow cylinder of the supporting stand through the O-rings; and
- a stopper provided between the supporting stand and the casing, for limiting the axial movement of the casing with respect to the hollow cylinder of the supporting stand.

In the Karman's vortex flow meter, the stopper may be of a shaft which is secured to a cylindrical wall forming a part of the casing in such a manner that the shaft is protruded inside the cylindrical wall. The shaft is inserted into a recess formed in the hollow cylinder of the supporting stand.

In the Karman's vortex flow meter, the amplifier's casing is fixedly fitted on the hollow cylinder of the supporting stand through a plurality of O-rings. Hence, even if the casing resonates with an external vibration, the resonance is scarcely transmitted to the detecting section built in the hollow cylinder of the supporting stand; that is, the O-rings having a damping function absorb the resonance. In addition, the stopper provided between the supporting stand and the casing limits the axial movement of the casing with respect to the hollow cylinder of the supporting stand.

In the Karman's vortex flow meter, the stopper is the shaft which is fixedly secured to the cylindrical wall of the casing.

The shaft thus secured is inserted in the recess formed in the hollow cylinder of the supporting stand. Hence, the hollow cylinder of the supporting stand and the casing are not shifted from each other more than the gap between the shaft and the inner surface of the recess.

The second means is a Karman's vortex flow meter which comprises:

a supporting stand having a hollow cylinder in which a detecting section concerning Karman's vortex is built, the supporting stand being mounted on a pipe line;

a casing for an amplifier adapted to amplify a signal concerning Karman's vortex, the casing being fitted on the hollow cylinder of the supporting stands; and annular damping members arranged on the outer and inner surfaces of the cylindrical wall of the casing in such a manner that the annular damping members are coaxial with through-holes formed in the cylindrical wall of the casing.

In the Karman's vortex flow meter, the annular damping members are arranged on the outer and inner surfaces of the cylindrical wall of the casing in such a manner as to surround the through-holes formed in the cylindrical wall of the casing. Hence, even if the casing resonates with an external vibration, the resonance is scarcely transmitted to the detecting section built in the hollow cylinder of the supporting stand; that is, in this case, the annular damping members substantially absorb the resonance.

DETAILED DESCRIPTION OF THE PREFERRED EMBODIMENTS

Two preferred embodiments of the invention will be described with reference to the accompanying drawings.
First Embodiment A Karman's vortex flow meter, which constitutes a first embodiment of the invention, will be described with reference to FIG. 1, a sectional side view, and FIG. 2, a sectional view taken along line A—A in FIG. 1.

The first embodiment is different from the above-described conventional Karman's vortex flow meter in the following two points: The first point resides in that the amplifier casing assembly is fixedly fitted on the upper end portion of the hollow cylinder of the supporting stand through O-rings having a damping function. The second point resides in that, even when the amplifier casing assembly is slightly axially shifted because it is not sufficiently secured to the hollow cylinder of the supporting stand, the amount of shift is limited to be in a certain range.

Figure 1:
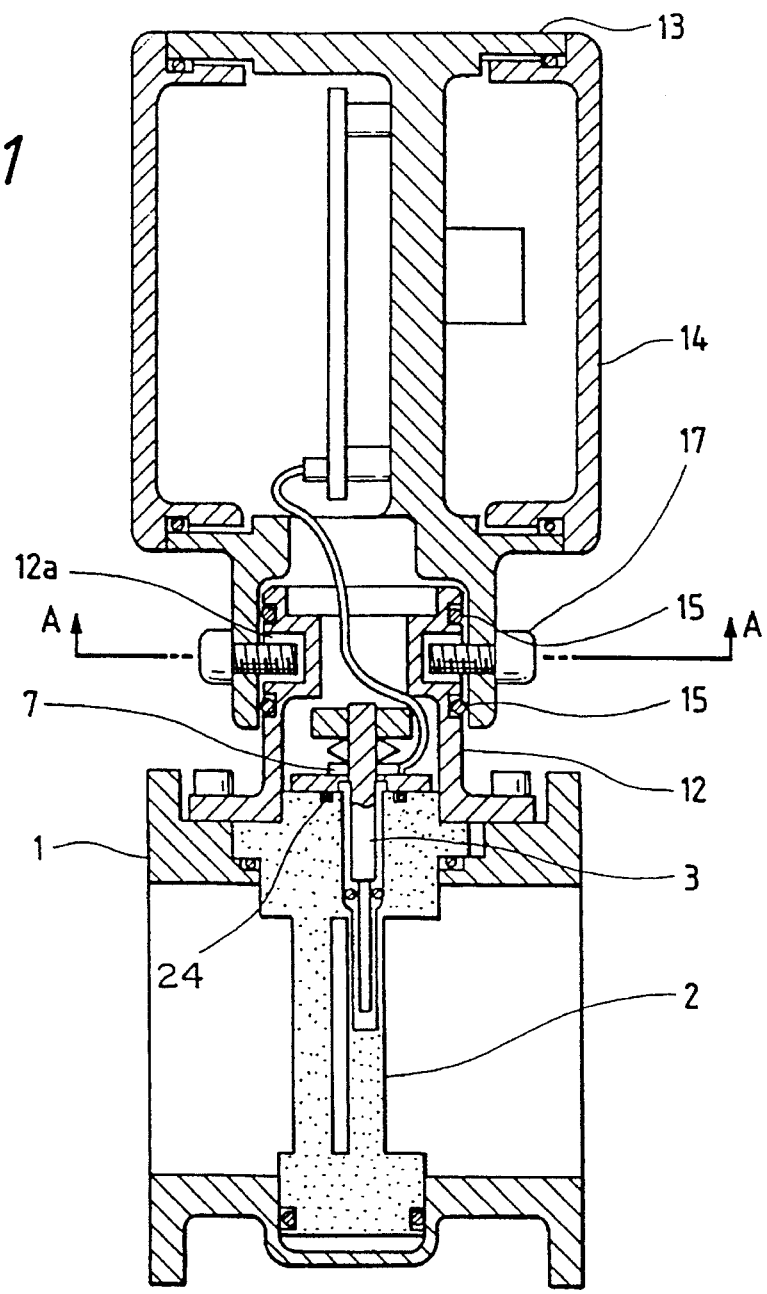
FIG. 1 is a sectional side view of an example of a Karman's vortex flow meter, which constitutes a first embodiment of the invention.

In the first embodiment, as shown in FIG. 1, a supporting stand 12 comprises a flange, and a hollow cylinder extended from the flange. Two annular grooves are formed in the outer surface of the hollow cylinder of the supporting stand 12, and O-rings 15 are inserted in the annular grooves. A pair of bottomed-round-hole-shaped recesses (or circular blind holes) 12a are formed in the outer surface of the hollow cylinder of the supporting stand in such a manner that they are diametrically opposite to each other and located between the O-rings 15, and that gaps are provided around bolts 17 which are to be inserted into the recesses. That is, the bolts 17, unlike those in the conventional Karman's vortex flow meter, are threadably engaged with the cylindrical wall of the casing 13 and fixedly protruded in the recesses 12a, but they are not in contact with the surfaces of the recesses 12a formed in the hollow cylinder of the supporting stand 12. In other words, the bolts 17 are not used to secure the casing 13 to the hollow cylinder of the supporting stand 12, and instead serve as stoppers for limiting the axial movement of the casing 13 with respect to the hollow cylinder of the supporting stand 12. More specifically, the axial movement of the casing 13 with respect to the hollow cylinder of the supporting stand 12 corresponds to the gap between the end portion of the bolt 17 and the recess 12a as viewed in the direction of axis of the supporting stand 12.

Figure 2:
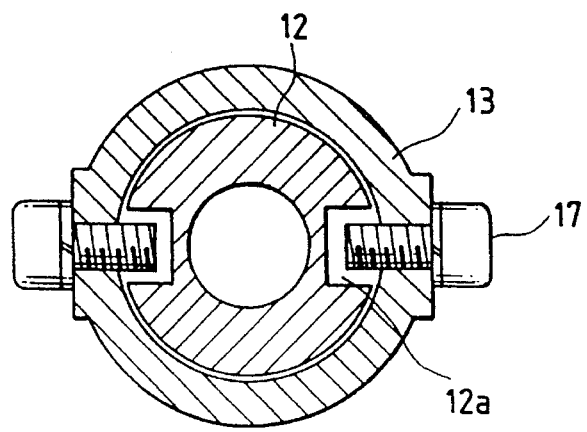
FIG. 2 is a sectional view taken along line A—A in FIG. 1.

The above-description will become more apparent when read in conjunction with FIG. 2. As shown in FIG. 2, the lower end portion of the casing 13, which is fixedly fitted on the upper end portion of the hollow cylinder of the supporting stand 12, is cylindrical (hereinafter referred to as "a cylindrical wall", when applicable), and has a pair of seats on which the heads of the bolts 17 are set.

In the Karman's vortex flow meter of the invention, the casing 13 is fixedly fitted on the upper end portion of the hollow cylinder of the supporting stand 12 through the two O-rings 15 having a damping function. As shown in FIGS. 1 and 2, the O-rings 15 are disposed between the lower end portion of the casing 13 and the hollow cylinder of the supporting stand 12 to fit the casing 13 and supporting stand 12 together. This forms an annular clearance between the lower end portion of the casing 13 and the hollow cylinder of the supporting stand 12 so that the casing 13 and supporting stand 12 do not directly contact one another. Hence, even if the casing 13 of the amplifier resonates with an external vibration, the resonance, being absorbed by the O-rings 15, is scarcely transmitted to the detecting section including the piezo-electric element 7 set inside the hollow cylinder of the supporting stand 12; that is, the effect of the resonance on the detecting section is minimized, and the measurement accuracy is maintained substantially unchanged. On the other hand, the bolts 17 screwed through the cylindrical wall of the casing 13 into the recesses 12a of the supporting stand 12 serve as stoppers to limit the axial movement of the casing 13 with respect to the hollow cylinder of the supporting stand 12. Hence, even when the casing 13 and the hollow cylinder of the supporting stand 12 are shifted from each other by the resonance, the amount of shift is limited, thus not affecting the operation of the detecting section at all.

The first embodiment was tested, resulting in that at the resonance of the casing 13 the noise output of the piezo-electric element 7 was not more than half of that in the conventional Karman's vortex flow meter; that is, the Karman's vortex flow meter was improved in measurement accuracy as much.
Second Embodiment Another example of the Karman's vortex flow meter, which constitutes a second embodiment of the invention, will be described with reference to FIG. 3, a sectional side view, and FIG. 4, a sectional view taken along line A—A in FIG. 3.

Figure 3:
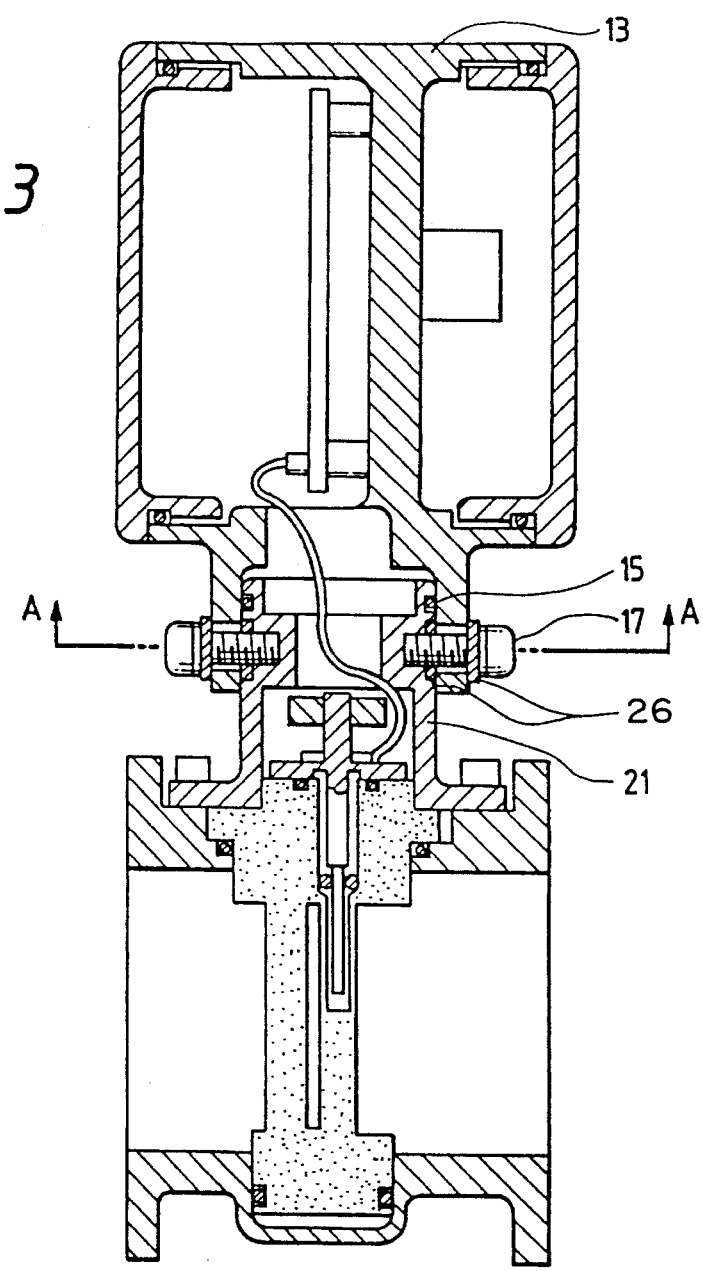
FIG. 3 is a sectional side view of another example of the Karman's vortex flow meter, which constitutes a second embodiment of the invention.
Figure 4:
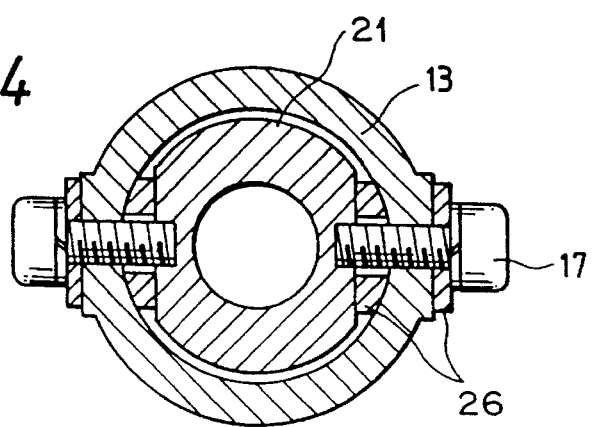
FIG. 4 is a sectional view taken along line A—A in FIG. 3.
Figure 5:
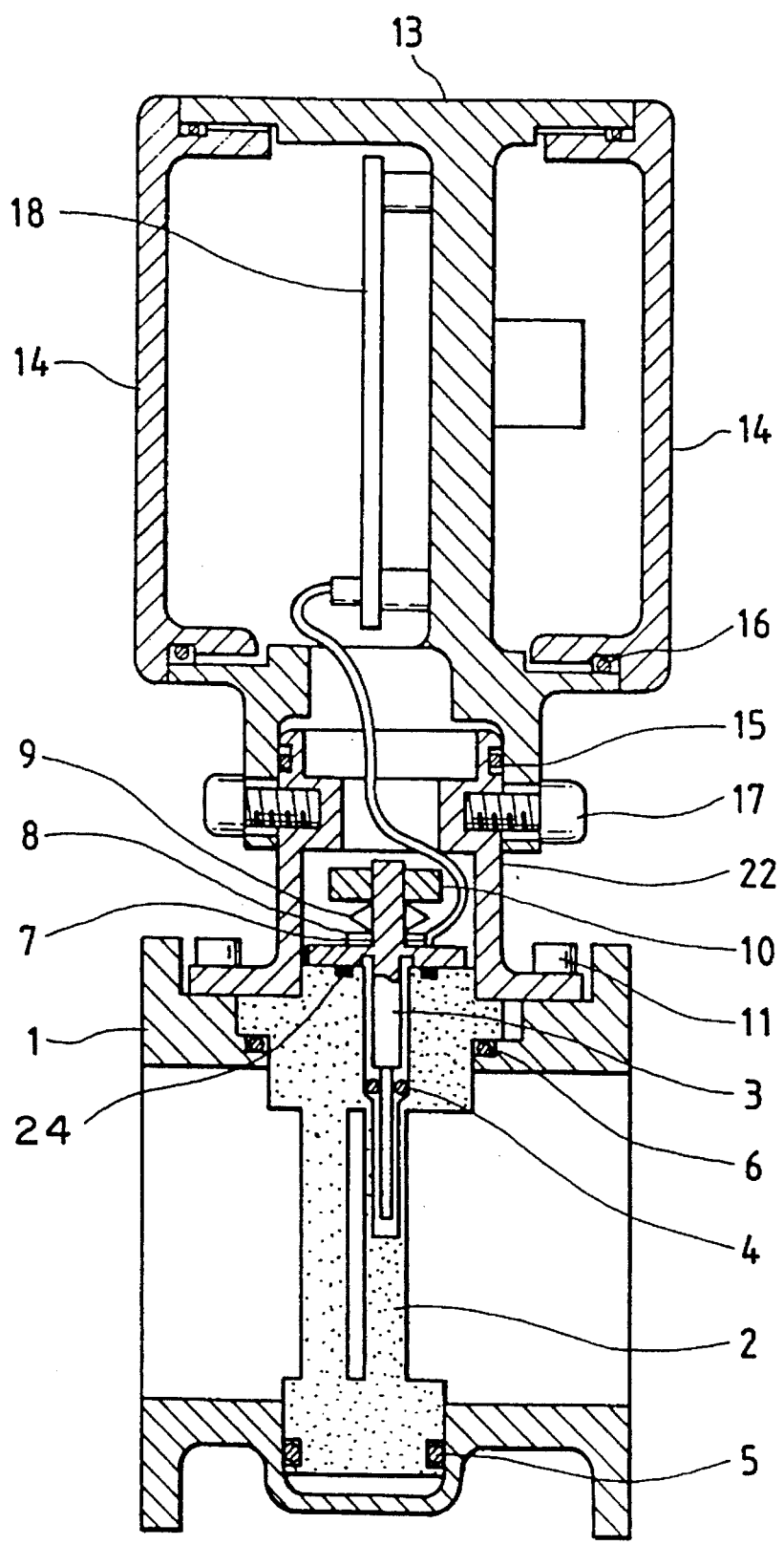
FIG. 5 is a sectional side view of a conventional Karman's vortex flow meter.

The second embodiment is different from the above-described conventional Karman's vortex flow meter in that the amplifier casing assembly is fixedly fitted on the hollow cylinder of the supporting stand with bolts screwed thereinto through annular damping members which are provided on the inner and outer surfaces of the cylindrical wall of the casing. As shown in FIG. 3, the cylindrical wall of the casing 13 is fixedly fitted on the hollow cylinder of a supporting stand 21 with the bolts 17. In this case, as shown in FIG. 4, annular damping members 26 of rubber material are set on the inner and outer surfaces of the hollow cylinder of the supporting stand 21 in such a manner that they are coaxial with threaded holes formed in the hollow cylinder with which the bolts 17 are to be engaged. Because annular damping members 26 are positioned between the cylindrical wall of the casing 13 and the hollow cylinder of the supporting stand 21, as shown in FIG. 4, the supporting stand 21 does not directly contact the casing 13. Hence, even if the casing 13 resonates with an external vibration, the resonance is scarcely transmitted to the detecting section accommodated in the hollow cylinder of the supporting stand 21 because the damping members 26 absorb the resonance, whereby the measurement accuracy is maintained high.

The second embodiment was tested, resulting in that at the resonance of the casing 13, the noise output of the piezoelectric element 7 was suppressed greatly to the extent that it was only slightly higher than in the first embodiment.

In the Karman's vortex flow meter of the first embodiment, the amplifier's casing is fixedly fitted on the hollow cylinder of the supporting stand through a plurality of O-rings. Hence, even if the casing resonates with an external vibration, the resonance is scarcely transmitted to the detecting section built in the hollow cylinder of the supporting stand; that is, the O-rings having a damping function absorb the resonance. In addition, the stopper provided between the supporting stand and the casing limits the axial movement of the casing with respect to the hollow cylinder of the supporting stand. Therefore, even if the casing resonates with an external vibration, the effect of the resonance on the detecting section is suppressed, so that the measurement accuracy is maintained high. Furthermore, the casing and the hollow cylinder of the supporting stand are prevented from shifting from each other beyond the limitation. Thus, the Karman's vortex flow meter operates satisfactorily at all times.

In case where the stopper is the shaft which is fixedly secured to the cylindrical wall of the casing, and the shaft thus secured is inserted in the recess formed in the hollow cylinder of the supporting stand, the hollow cylinder of the supporting stand and the casing are not shifted from each other more than the gap between the shaft and the inner surface of the recess. That is, the Karman's vortex flow meter, when compared with the conventional one, is simple in structure, and can be readily manufactured at low cost.

In the Karman's vortex flow meter of second embodiment, the amplifier's casing is fitted on the hollow cylinder of the supporting stand with the bolts which are screwed in through the annular damping members arranged on the outer and inner surfaces of the cylindrical wall of the casing in such a manner that the annular damping members are coaxial with the through-holes formed in the cylindrical wall of said casing. Hence, even if the casing resonates with an external vibration, the resonance is scarcely transmitted to the detecting section built in the hollow cylinder of the supporting stand; that is, in this case, the annular damping members substantially absorb the resonance. In other words, the effect of the resonance on the detecting section is suppressed, and the measurement accuracy is maintained high.

What is claimed is:

1. A Karman's vortex flow meter, comprising:

a supporting stand mounted on a pipe line, said supporting stand including a hollow cylinder having a flow meter detecting section therein;

O-rings fitted in annular grooves formed on an outer surface of said hollow cylinder of said supporting stand;

a casing fitted on said hollow cylinder of said supporting stand with said O-rings positioned therebetween so that said O-rings frictionally support said casing on said hollow cylinder, said casing having a flow meter amplifier disposed therein; and a stopper provided between said supporting stand and said casing, said stopper permitting limited axial movement of said casing with respect to said hollow cylinder of said supporting stand.

2. The Karman's vortex flow meter according to claim 1, wherein said stopper includes a shaft secured to a cylindrical wall of said casing, said shaft protruding from said cylindrical wall into a recess formed in said hollow cylinder of said supporting stand out of direct contact with said hollow cylinder.

3. A Karman's vortex flow meter, comprising:

a supporting stand mounted on a pipe line, said supporting stand including a hollow cylinder having a flow meter detecting section therein;

a casing fitted on said hollow cylinder of said supporting stand, said casing including a flow meter amplifier disposed therein and a cylindrical wall having holes formed therethrough; and annular damping members arranged on outer and inner surfaces of said cylindrical wall of said casing, said annular damping members being coaxial with the holes formed in said cylindrical wall of said casing.

4. A Karman's vortex flow meter, comprising:

a supporting stand mounted on a pipe line, said supporting stand including a hollow cylinder having a flow meter detecting section therein;

a casing for containing therein an amplifier to amplify a signal from said detecting section; and elastic means for floatingly mounting said casing onto said hollow cylinder of said supporting stand with said casing out of direct contact with said hollow cylinder.

5. The Karman's vortex flow meter according to claim 4, wherein said elastic means includes at least one O-ring received in an annular groove formed in said hollow cylinder, said O-ring protruding from said hollow cylinder, supporting said casing on said hollow cylinder, and forming an annular clearance between said hollow cylinder and said casing.

6. The Karman's vortex flow meter according to claim 4, further comprising:

displacement limiting means for permitting limited displacement of said casing relative to said hollow cylinder.

7. The Karman's vortex flow meter according to claim 6, wherein said displacement limiting means includes a blind hole formed in said hollow cylinder and a bolt threadingly engaged with said casing, said bolt extending into said blind hole and having an outer diameter less than an inner diameter of said blind hole.

8. The Karman's vortex flow meter according to claim 4, further comprising a bolt threadingly engaged with said hollow cylinder, said bolt passing through a hole formed through said casing, wherein said elastic means includes a first annular damping member provided between said casing and said hollow cylinder and a second annular damping member provided between said casing and a head portion of said bolt, and wherein said bolt passes through said first and second annular damping members.

9. The Karman's vortex flow meter according to claim 1, wherein said O-rings support said casing on said hollow cylinder such that said casing is spaced from said hollow cylinder.

10. The Karman's vortex meter according to claim 3, further comprising bolts passing through said holes such that said bolts support said casing on said hollow cylinder, said annular damping members on the outer surface of the cylindrical wall being interposed between the cylindrical wall and heads of said bolts, and said annular damping members on the inner surface of the cylindrical wall being interposed between the cylindrical wall and the hollow cylinder.

* * * * *